(12) United States Patent
Mani et al.

(10) Patent No.: US 11,719,295 B2
(45) Date of Patent: Aug. 8, 2023

(54) BRAKE DRUM

(71) Applicant: Volvo Truck Corporation, Gothenburg (SE)

(72) Inventors: Boopathy Mani, Bangalore (IN); Sundar Vignesh Alavandar, Chennai (IN)

(73) Assignee: Volvo Truck Corporation, Gothenburg (SE)

( * ) Notice: Subject to any disclaimer, the term of this patent is extended or adjusted under 35 U.S.C. 154(b) by 143 days.

(21) Appl. No.: 17/608,195

(22) PCT Filed: May 19, 2020

(86) PCT No.: PCT/EP2020/063891
§ 371 (c)(1),
(2) Date: Nov. 2, 2021

(87) PCT Pub. No.: WO2020/234264
PCT Pub. Date: Nov. 26, 2020

(65) Prior Publication Data
US 2022/0228633 A1 Jul. 21, 2022

(30) Foreign Application Priority Data
May 20, 2019 (IN) .............................. 201941019717

(51) Int. Cl.
*F16D 65/10* (2006.01)
*F16D 51/00* (2006.01)
*F16D 65/02* (2006.01)

(52) U.S. Cl.
CPC .............. *F16D 65/10* (2013.01); *F16D 51/00* (2013.01); *F16D 2065/1328* (2013.01)

(58) Field of Classification Search
CPC .......................... F16D 51/00; F16D 2065/1328
(Continued)

(56) References Cited

U.S. PATENT DOCUMENTS 2,008,811 A * 7/1935 Paule .................... F16D 65/827
188/218 R
9,145,937 B2 * 9/2015 Fakhoury ................ F16D 65/10
(Continued)

FOREIGN PATENT DOCUMENTS

CN 201827275 U * 5/2011 ............. F16D 65/78
EP 3181936 A1 6/2017

OTHER PUBLICATIONS

International Search Report and Written Opinion for International Patent Application No. PCT/EP2020/063891, dated Aug. 26, 2020, 10 pages.

*Primary Examiner* — Christopher P Schwartz
(74) *Attorney, Agent, or Firm* — Withrow & Terranova, PLLC

(57) ABSTRACT

The present disclosure relates to a brake drum for a drum brake for a vehicle. The brake drum comprises a braking surface adapted to receive at least one brake shoe of the drum brake. The brake drum further comprises a cooling arrangement comprising a set of cooling conduits located between a braking surface and an outer surface.

The material of the brake drum located radially between the set of cooling conduits and the braking surface at an inner axial cross-section has an inner axial aggregate thermal conductance and the material of the brake drum located radially between the set of cooling conduits and the braking surface at the outer axial cross-section has an outer axial aggregate thermal conductance.

Accordingly, the inner axial aggregate thermal conductance is different from the outer axial aggregate thermal conductance.

14 Claims, 4 Drawing Sheets

(58) Field of Classification Search
USPC .. 188/74, 78, 218 R, 264 A, 264 AA, 264 R
See application file for complete search history.

(56) References Cited

U.S. PATENT DOCUMENTS

| | | | |
|---|---|---|---|
| 9,322,443 B2 * | 4/2016 | Bordere | F16D 65/10 |
| 9,322,446 B2 * | 4/2016 | Plantan | F16D 65/827 |
| 2003/0178270 A1 * | 9/2003 | Vollert | F16D 65/10 |
| | | | 188/264 R |
| 2011/0278102 A1 * | 11/2011 | Cornett | F16D 65/10 |
| | | | 188/1.11 W |

* cited by examiner

BRAKE DRUM

This application is a 35 USC 371 national phase filing of International Application No. PCT/EP2020/063891, filed May 19, 2020, which claims the benefit of priority of Indian Patent Application No. 201941019717 filed May 20, 2019, the disclosures of which are incorporated herein by reference in their entireties.

TECHNICAL FIELD

The invention relates to a brake drum for a drum brake for a vehicle. Moreover, the invention relates to a drum brake for a vehicle. Additionally, the invention relates to a vehicle.

The invention can be applied in heavy-duty vehicles, such as trucks, buses and construction equipment. Although the invention will be described with respect to a truck, the invention is not restricted to this particular vehicle, but may also be used in other vehicles such as buses and construction equipment.

BACKGROUND

A vehicle may comprise a plurality of wheels. Moreover, one or more of the wheels may be equipped with a drum brake. The drum brake comprises a brake drum and a brake shoe wherein the brake shoe is adapted to abut a braking surface of the brake drum for braking the wheel.

In order to control the cooling of the brake drum, US 2003/0178270 A1 proposes that ventilation openings be arranged in the drum. However, the US 2003/0178270 A1 may result in an undesirably large cooling of certain areas of the brake drum.

SUMMARY

An object of the invention is to provide a brake drum in which the cooling thereof can be controlled in an appropriate manner.

The object is achieved by a brake drum according to claim 1.

As such, the present invention relates to a brake drum for a drum brake for a vehicle. The vehicle has a longitudinal centre plane extending along a longitudinal direction and a vertical direction and separating the vehicle into a first and a second longitudinal half. The longitudinal direction extends in a direction parallel to the intended direction of travel of the vehicle. The brake drum comprises a braking surface adapted to receive at least one brake shoe of the drum brake. The braking surface has a circumferential extension in a circumferential direction and an axial extension in an axial direction. The brake drum further comprises an outer surface at least partially enclosing the braking surface.

The brake drum further comprises a cooling arrangement, comprising a set of cooling conduits located between the braking surface and the outer surface and extending at least partially in the axial direction. The brake drum comprises an inner axial cross-section and an outer axial cross-section which are located within the axial extension of the braking surface, wherein when the brake drum is mounted to the vehicle, the inner axial cross-section is located closer to the centre plane than the outer axial cross-section, as seen in the axial direction. The cooling arrangement also extends through each one of the inner axial cross-section and the outer axial cross-section.

The material of the brake drum located radially between the set of cooling conduits and the braking surface at the inner axial cross-section has an inner axial aggregate thermal conductance. The material of the brake drum located radially between the set of cooling conduits and the braking surface at the outer axial cross-section has an outer axial aggregate thermal conductance.

According to the present invention, the inner axial aggregate thermal conductance is different from the outer axial aggregate thermal conductance.

Generally, the term "thermal conductance" of a plate may be defined as the quantity of heat that passes in unit time through the plate of a particular area and thickness when its opposite faces differ in temperature by one Kelvin. The thermal conductance is dependent on the thermal conductivity of the material of the plate, the thickness of the plate as well as the area of the plate.

As such, as used herein, the term "axial aggregate thermal conductance" relates to the quantity of heat that passes in unit time—for a predetermined length unit in the axial direction of a cross-section of the brake drum, assuming a constant cross-section of the brake drum—through the material of the brake drum located radially between the set of cooling conduits and the braking surface when its opposite faces, i.e. braking surface and the surfaces of the cooling conduits, differ in temperature by one Kelvin. The "axial aggregate thermal conductance" is dependent on the thermal conductivity of the material, the thickness of the material as well as the area of the material.

By virtue of the fact that the inner axial aggregate thermal conductance is different from the outer axial aggregate thermal conductance, the cooling of the brake drum can be controlled in an appropriate manner. For instance, depending on the design of a drum brake with a brake drum and at least one brake shoe, it may be desired to cool a certain portion of the brake drum more than another portion thereof and such a controlled cooling may be achieved by the above-mentioned differences in aggregate thermal conductance.

Optionally, the inner axial aggregate thermal conductance is smaller than the outer axial aggregate thermal conductance.

By virtue of the fact that the inner axial aggregate thermal conductance is smaller than the outer axial aggregate thermal conductance, the cooling towards the outboard side, i.e. away from the above-mentioned centre plane, of the braking surface will be larger than the cooling towards the inboard side, i.e. towards the above-mentioned centre plane. This in turn implies an appropriate braking capacity of the drum brake in which a brake shoe is adapted to abut an inboard side of the braking surface since the braking effect obtained when the brake shoe abuts the braking surface may benefit from the braking surface contacting the brake shoe not being excessively cooled. Put differently, the braking effect of the drum brake may be appropriate if the temperature of the cooling surface adapted to receive the brake shoe is at or above a certain temperature.

Optionally, the set of cooling conduits at the inner axial cross-section together have an inner axial cooling cross-sectional area. The set of cooling conduits at the outer axial cross-section together have an outer axial cooling cross-sectional area. The inner axial cooling cross-sectional area is different from the outer axial cooling cross-sectional area.

Arranging the cooling conduits such that the inner axial cooling cross-sectional area is different from the outer axial cooling cross-sectional area implies that the inner axial aggregate thermal conductance is different from the outer axial aggregate thermal conductance. As such, by changing the aggregated cross-sectional area between the two axial cross-sections of the brake drum implies a preferred cooling of the brake drum.

Optionally, the inner axial cooling cross-sectional area is smaller than the outer axial cooling cross-sectional area. Arranging the cooling conduits such that the inner axial cooling cross-sectional area is smaller than the outer axial cooling cross-sectional area implies that the inner axial aggregate thermal conductance is smaller than the outer axial aggregate thermal conductance.

Optionally, the larger one of the inner axial cooling cross-sectional area and the outer axial cooling cross-sectional area is at least 30%, preferably at least 40%, larger than the other one of the inner axial cooling cross-sectional area and the outer axial cooling cross-sectional area.

Optionally, two or more cooling conduits portions of the set of cooling conduits at the outer axial cross-section are connected to a common cooling conduit portion of the set of cooling conduits at the inner axial cross-section.

Optionally, the set of cooling conduits at the inner axial cross-section have an average radial distance to the braking surface, the set of cooling conduits at the outer axial cross-section having an average radial distance to the braking surface. The average radial distance of the inner axial cross-section is different from the average radial distance of the outer axial cross-section.

The thermal conductance of the material between the cooling conduits and the braking surface is dependent on the thickness of the material. Thus, arranging the cooling conduits such that the average radial distance of the inner axial cross-section is different from the average radial distance of the outer axial cross-section implies that the inner and outer cross-sections have different thermal conductance.

Optionally, the average radial distance of the inner axial cross-section is greater than the average radial distance of the outer axial cross-section. Arranging the cooling conduits such that the average radial distance of the inner axial cross-section is greater than the average radial distance of the outer axial cross-section implies that the inner axial aggregate thermal conductance is smaller than the outer axial aggregate thermal conductance.

Optionally, the larger one of the average radial distance of the inner axial cross-section and the average radial distance of the outer axial cross-section is at least 30%, preferably at least 40%, larger than the other one of the average radial distance of the inner axial cross-section and the average radial distance of the outer axial cross-section.

Optionally, at least one cooling conduit of the set of cooling conduits extends axially over at least 90%, preferably over 100%, of the axial extension of the braking surface. Such an extension of the set of cooling conduits implies an appropriate cooling of the braking surface.

Optionally, a distance in the axial direction between the inner axial cross-section and the outer axial cross-section is at least 10%, preferably at least 20%, of the axial extension of the braking surface.

Optionally, the larger one of said inner and outer axial aggregate thermal conductances is at least 30%, preferably at least 40%, larger than the other one of said inner and outer axial aggregate thermal conductances.

A second aspect of the present invention relates to a drum brake for a vehicle. The drum brake comprises a brake drum according to the first aspect of the present invention and a brake shoe.

A third aspect of the present invention relates to a vehicle comprising a brake drum according to the first aspect of the present invention and/or a drum brake according to the second aspect of the present invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The invention will be described below for a vehicle in the form of a truck 10 such as the truck illustrated in FIG. 1. The truck 10 should be seen as an example of a vehicle which could comprise a control unit according to the present invention for which the method of the present invention could be carried out. However, the present invention may be implemented in a plurality of different types of vehicles. Purely by way of example, the present invention could be implemented in a truck, a tractor, a car, a bus, a work machine such as a wheel loader or any other type of construction equipment.

Figure 1:
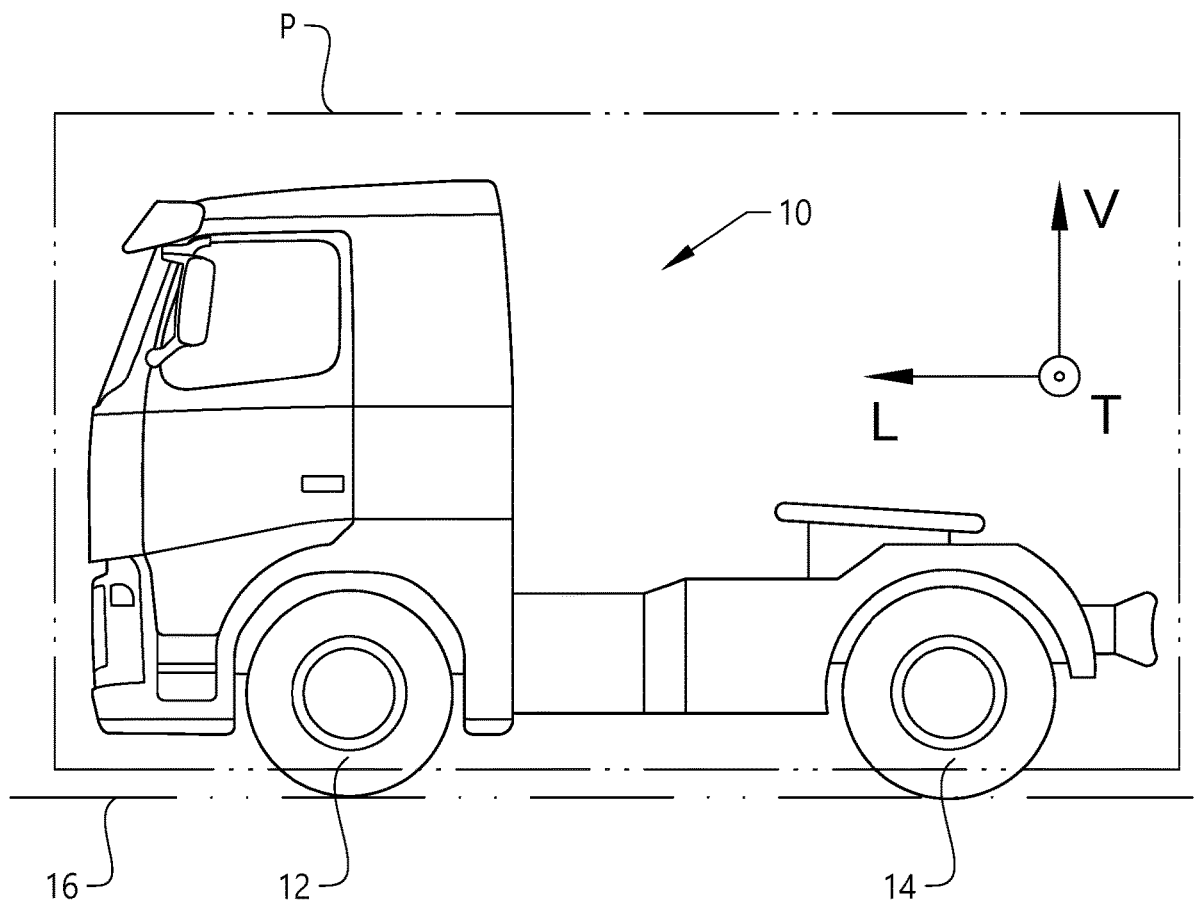
FIG. 1 is a schematic side view of a vehicle.

The FIG. 1 vehicle 10 comprises a set of wheels 12, 14 being adapted to be supported by a ground surface 16. Although the FIG. 1 embodiment of the vehicle 10 comprises a pair of front wheels 12 and a pair of rear wheels 14, it is of course envisaged that other embodiments of the vehicle 10 may comprise fewer or more wheels.

Additionally, FIG. 1 indicates that the vehicle 10 has a longitudinal centre plane P extending along a longitudinal direction L and a vertical direction V and separating the vehicle into a first and a second longitudinal half. FIG. 1 further illustrates that the vehicle 10 has an extension in a transversal direction T being perpendicular to each one of the longitudinal direction L and the vertical direction V.

Figure 2:
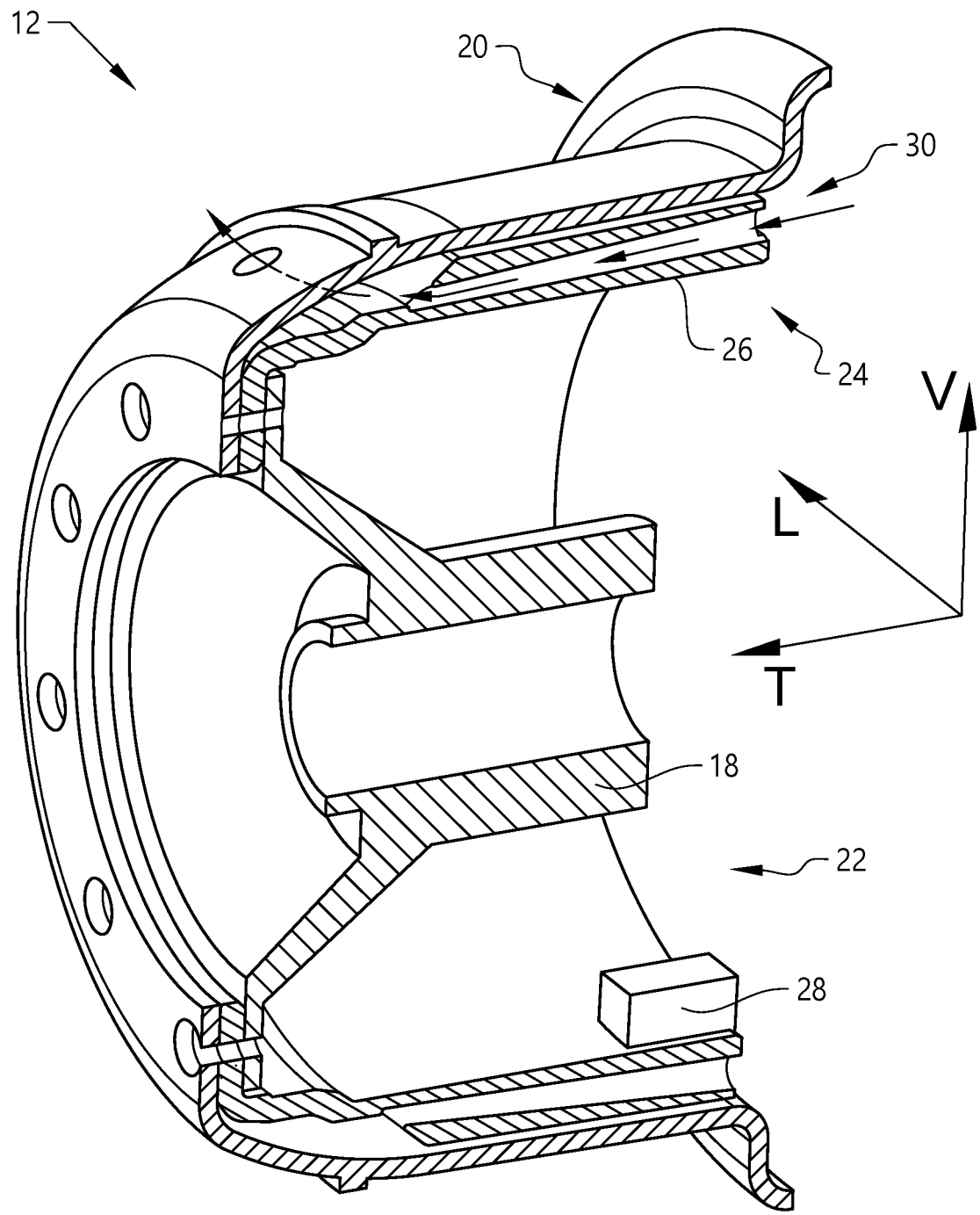
FIG. 2 is a schematic partial cross-sectional perspective view of a wheel.

FIG. 2 illustrates portions of a wheel 12. The FIG. 2 wheel 12 is exemplified as one of the front wheels of the FIG. 1 set of wheels, but the FIG. 2 wheels can of course be used for other vehicles, and other vehicle types, as well.

The wheel 12 illustrated in FIG. 2 comprises a wheel hub 18 adapted to be connected to an axle (not shown) of the vehicle (not shown in FIG. 2). The wheel hub 18 is connected to a wheel rim 20 adapted to receive a tyre (not shown). Furthermore, the FIG. 2 wheel 12 comprises a drum brake 22 which in turn comprises a brake drum 24 with a braking surface 26. The drum brake 22 further comprises a brake shoe 28 and the braking surface 26 is adapted to receive the brake shoe 28.

Furthermore, the brake drum 24 comprises a cooling arrangement 30 comprising a set of cooling conduits through which cooling fluid, such as air, may flow for cooling the brake drum 24. Preferably, and as indicated in FIG. 2, at least one cooling conduit of the set of cooling conduits extends axially over at least 90%, preferably over 100%, of the axial extension of the braking surface 26.

Figure 3:
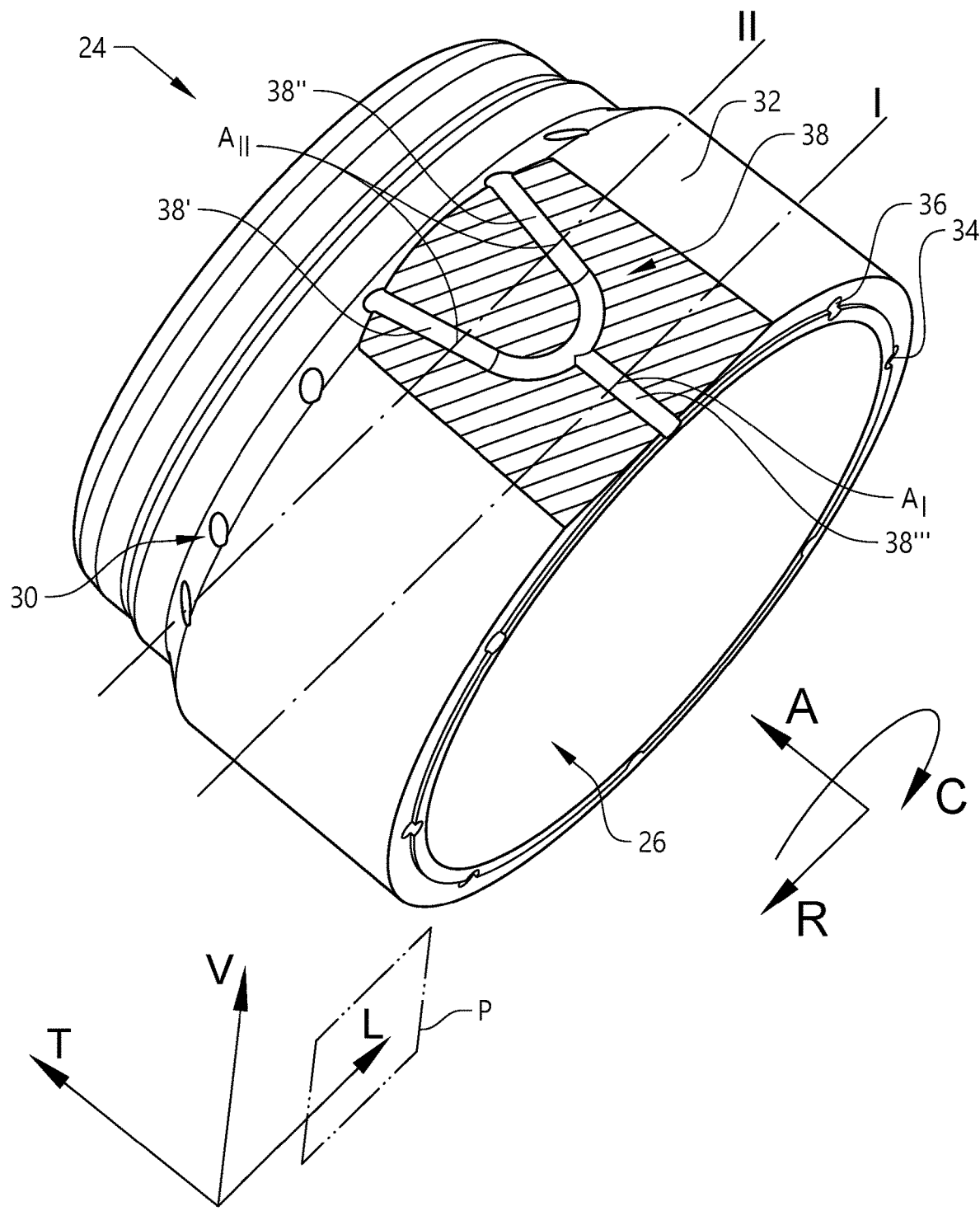
FIG. 3 is a schematic partial cross-sectional perspective view of an embodiment of a brake drum.

FIG. 3 illustrates an embodiment of a brake drum 24 for a drum brake 22. The brake drum 24 comprises a braking surface 26 adapted to receive at least one brake shoe (not shown in FIG. 3) of the drum brake. The braking surface 26 has a circumferential extension in a circumferential direction C and an axial extension in an axial direction A. Purely by way of example, and as indicated in FIG. 3, the axial direction A may be parallel to the transversal direction T. The brake drum 24 further comprises an outer surface 32 at least partially enclosing the braking surface 26.

The brake drum 24 further comprises a cooling arrangement 30, comprising a set of cooling conduits 34, 36, 38 located between the braking surface 26 and the outer surface 32 and extending at least partially in the axial direction A. As such, the cooling arrangement 30 extends radially, i.e. in a radial direction R, outside the braking surface 26. Thus, the cooling arrangement 30 does not comprise any opening in the braking surface 26.

The brake drum 24 comprises an inner axial cross-section I and an outer axial cross-section II which are located within the axial extension of the braking surface 26. When the brake drum 24 is mounted to the vehicle 10, the inner axial cross-section I is located closer to the centre plane P than the outer axial cross-section II, as seen in the axial direction A. The cooling arrangement 30 extends through each one of the inner axial cross-section I and the outer axial cross-section II.

Purely by way of example, the braking surface 26 may have a braking surface extension in the axial direction A and the distance in the axial direction between the inner axial cross-section I and the outer axial cross-section II is at least 10%, preferably at least 20%, of the braking surface extension.

Moreover, the material of the brake drum 26 located radially between the set of cooling conduits 34, 36, 38 and the braking surface 26 at the inner axial cross-section I has an inner axial aggregate thermal conductance. The material of the brake drum 26 located radially between the set of cooling conduits 34, 36, 38 and the braking surface 26 at the outer axial cross-section II has an outer axial aggregate thermal conductance. The inner axial aggregate thermal conductance is different from the outer axial aggregate thermal conductance. Purely by way of example, the larger one of said inner and outer axial aggregate thermal conductances may be at least 30%, preferably at least 40%, larger than the other one of said inner and outer axial aggregate thermal conductances.

As will be explained further hereinbelow, in the embodiment illustrated in FIG. 3, the inner axial aggregate thermal conductance is smaller than the outer axial aggregate thermal conductance. However, it is also envisaged that the inner axial aggregate thermal conductance may be greater than the outer axial aggregate thermal conductance in other embodiments of the invention.

As indicated in the summary of the invention, the term "thermal conductance" of a plate may be defined as the quantity of heat that passes in unit time through the plate of a particular area and thickness when its opposite faces differ in temperature by one Kelvin. The plate's thermal conductance is dependent on the thermal conductivity of the material of the plate, the thickness of the plate as well as the area of the plate. Generally, the term "thermal conductance" of a plate can be defined in accordance with the following: $kA/L$, wherein:

k=thermal conductivity of the material of the plate;
A=area of the plate, and
L=thickness of the plate.

In a similar vein, the term "axial aggregate thermal conductance" relates to the quantity of heat that passes in unit time—for a predetermined length unit in the axial direction of a cross-section of the brake drum, assuming a constant cross-section of the brake drum—through the material of the brake drum located radially between the set of cooling conduits of the cooling arrangement and the braking surface when its opposite faces, i.e. the braking surface and the surfaces of the cooling conduits, differ in temperature by one Kelvin.

The axial aggregate thermal conductance for each one of the two cross-sections can be determined in a plurality of ways. Purely by way of example, the axial aggregate thermal conductance may be determined by generating a computer model, such as a finite element model, of each one of the two cross-sections and apply a temperature difference of one Kelvin from the braking surface to the surfaces of the cooling conduits in order to determine a value indicative of the axial aggregate thermal conductance.

As another option, the axial aggregate thermal conductance may be determined using the a simplified model, for instance in accordance with the following: $kwd/L_{av}$, wherein:

k=thermal conductivity of the material of material of the brake drum 26;
w=aggregated width of the cooling conduits as measured along the circumference of the brake drum 26;
d=predetermined length unit in the axial direction, and
L=average thickness between the braking surface and the cooling conduits.

It should be noted that the predetermined length unit d in the axial direction may be set to any positive value as long as the same value is used for the inner axial cross-section I and the outer axial cross-section II.

As may be realized from the above, the axial aggregate thermal conductance increases with an increasing aggregated width w of the cooling conduits. Moreover, the axial aggregate thermal conductance increases with a decreasing average thickness $L_{av}$. Furthermore, different values of the axial aggregate thermal conductance for the two cross-sections I, II may be obtained by using different materials with different thermal conductivities for the two cross-sections I, II. Of course, any combination of the above three options is contemplated.

The above difference in axial aggregate thermal conductance may be achieved in a plurality of different ways. In the embodiment illustrated in FIG. 3, the difference in axial aggregate thermal conductance is obtained by different cross-sectional areas at the inner and outer axial cross-sections, respectively. Put differently, the difference in axial aggregate thermal conductance may be obtained by different aggregated widths of the cooling conduits.

As such, in the FIG. 3 embodiment, the set of cooling conduits at the inner axial cross-section I together have an inner axial cooling cross-sectional area $A_I$. Moreover, the set of cooling conduits at the outer axial cross-section II together have an outer axial cooling cross-sectional area $A_{II}$. The inner axial cooling cross-sectional area $A_I$ is different from the outer axial cooling cross-sectional area $A_{II}$. As a non-limiting example, the larger one of said inner axial cooling cross-sectional area $A_I$ and said outer axial cooling cross-sectional area $A_{II}$ may be at least 30%, preferably at least 40%, larger than the other one of said inner axial cooling cross-sectional area $A_I$ and said outer axial cooling cross-sectional area $A_{II}$. In the FIG. 3 embodiment, the inner axial cooling cross-sectional area $A_I$ is smaller than the outer axial cooling cross-sectional area $A_{II}$.

The different axial cooling cross-sectional areas $A_I$, $A_{II}$ area can be obtained in a plurality of different ways. Purely by way of example, one or more of the cooling conduits 34, 36, 38 may have different cross-sectional areas along the axial direction A. As a non-limiting example, one or more of the cooling conduits 34, 36, 38 may be funnel-shaped and may thus be wider at the outer axial cross-section II than at the inner axial cross-section I, or vice versa.

However, FIG. 3 illustrates an embodiment of the brake drum 26 in which two or more cooling conduits portions 38', 38" of the set of cooling conduits at the outer axial cross-section II are connected to a common cooling conduit portion 38''' of the set of cooling conduits at the inner axial cross-section I. As such, the cooling conduit 38 in the FIG. 3 embodiment is substantially Y-shaped.

Instead of, or in addition, to arranging the cooling conduits 34, 36, 38 with different cross-sectional areas along the axial direction A, the different axial aggregate thermal conductivities may be obtained in other ways.

Figure 4:
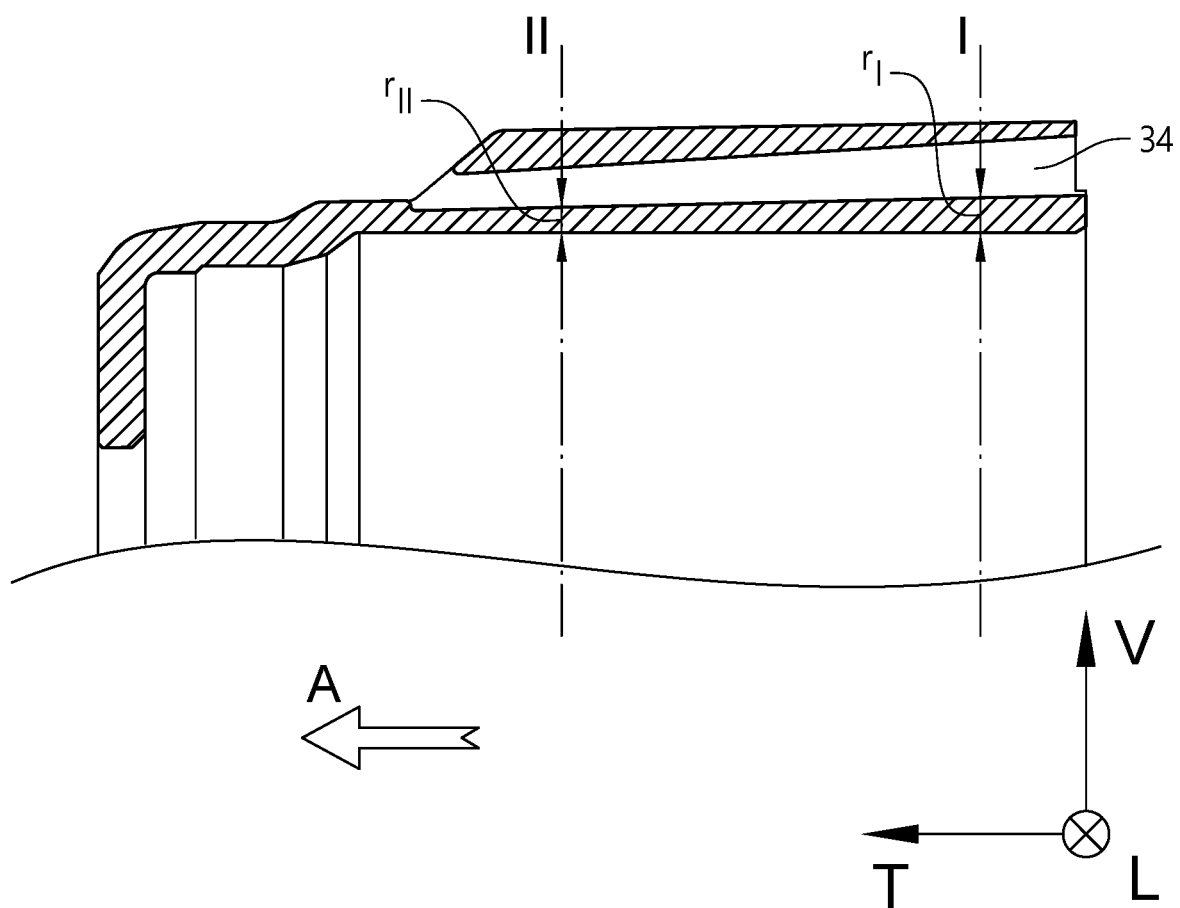
FIG. 4 is a cross-sectional side view of another embodiment of a brake drum.

For instance, as has been intimated hereinabove, the axial aggregate thermal conductance increases with a decreasing average thickness $L_{av}$. To this end, reference is made to FIG. 4, illustrating a cross-section view, in the V-T plane, of another embodiment of the brake drum 26. In the FIG. 4 embodiment, the set of cooling conduits 34, 36, 38 at the inner axial cross-section I have an average radial distance $r_I$ to the braking surface 26. The above average distance $r_I$ is in FIG. 4 illustrated for one cooling conduit 34 only. Moreover, the set of cooling conduits at the outer axial cross-section II have an average radial distance $r_{II}$ to the braking surface. The average radial distance $r_I$ of the inner axial cross-section I is different from the average radial distance $r_{II}$ of the outer axial cross-section II.

Purely by way of example, the larger one of the average radial distance $r_I$ of the inner axial cross-section I and the average radial distance $r_{II}$ of the outer axial cross-section II may be at least 30%, preferably at least 40%, larger than the other one of the average radial distance $r_I$ of the inner axial cross-section I and the average radial distance $r_{II}$ of the outer axial cross-section II.

In the FIG. 4 embodiment, the average radial distance $r_I$ of the inner axial cross-section I is greater than the average radial distance $r_{II}$ of the outer axial cross-section II. However, embodiments are also contemplated in which the average radial distance $r_I$ of the inner axial cross-section I is smaller than the average radial distance $r_{II}$ of the outer axial cross-section II.

It is to be understood that the present invention is not limited to the embodiments described above and illustrated in the drawings; rather, the skilled person will recognize that many changes and modifications may be made within the scope of the appended claims. Purely by way of example, although FIG. 3 illustrates an embodiment with different cross-sectional areas at the inner and outer axial cross-sections I, II and FIG. 4 illustrates an embodiment with different average radial distances $r_I$, $r_{II}$, it is of course envisaged that embodiments of the present invention may comprise a combination of different cross-sectional areas and different average radial distances between the two cross-sections I, II.

The invention claimed is:

1. A brake drum for a drum brake for a vehicle, the vehicle having a longitudinal center plane extending along a longitudinal direction and a vertical direction and separating the vehicle into a first and a second longitudinal half, the longitudinal direction extending in a direction parallel to the intended direction of travel of the vehicle, the brake drum comprising:
   a braking surface adapted to receive at least one brake shoe of the drum brake, the braking surface having a circumferential extension in a circumferential direction and an axial extension in an axial direction, the brake drum further comprising an outer surface at least partially enclosing the braking surface,
   a cooling arrangement, comprising a set of cooling conduits located between the braking surface and the outer surface and extending at least partially in the axial direction, and
   an inner axial cross-section and an outer axial cross-section which are located within the axial extension of the braking surface,
   wherein the brake drum is configured to be mounted to the vehicle such that the inner axial cross-section is located closer to the center plane than the outer axial cross-section,
   wherein the cooling arrangement extends through each one of the inner axial cross-section and the outer axial cross-section, the material of the brake drum located radially between the set of cooling conduits and the braking surface at the inner axial cross-section having an inner axial aggregate thermal conductance, the material of the brake drum located radially between the set of cooling conduits and the braking surface at the outer axial cross-section having an outer axial aggregate thermal conductance,
   wherein the inner axial aggregate thermal conductance is different from the outer axial aggregate thermal conductance.

2. The brake drum of claim 1, wherein:
   the set of cooling conduits at the inner axial cross-section have an inner axial cooling cross-sectional area, and
   the set of cooling conduits at the outer axial cross-section have an outer axial cooling cross-sectional area,
   the inner axial cooling cross-sectional area being different from the outer axial cooling cross-sectional area.

3. The brake drum of claim 2, wherein the inner axial cooling cross-sectional area is smaller than the outer axial cooling cross-sectional area.

4. The brake drum of claim 3, wherein two or more cooling conduits portions of the set of cooling conduits at the outer axial cross-section are connected to a common cooling conduit portion of the set of cooling conduits at the inner axial cross-section.

5. The brake drum of claim 2, wherein the larger one of the inner axial cooling cross-sectional area and the outer axial cooling cross-sectional area is at least 30% larger than the other one of the inner axial cooling cross-sectional area and the outer axial cooling cross-sectional area.

6. The brake drum of claim 1, wherein:
   the set of cooling conduits at the inner axial cross-section have an average radial distance to the braking surface, and
   the set of cooling conduits at the outer axial cross-section have an average radial distance to the braking surface,
   the average radial distance of the inner axial cross-section being different from the average radial distance of the outer axial cross-section.

7. The brake drum of claim 6, wherein the average radial distance of the inner axial cross-section is greater than the average radial distance of the outer axial cross-section.

8. The brake drum of claim 6, wherein the larger one of the average radial distance of the inner axial cross-section and the average radial distance of the outer axial cross-section is at least 30% larger than the other one of the average radial distance of the inner axial cross-section and the average radial distance of the outer axial cross-section.

9. The brake drum of claim 1, wherein the inner axial aggregate thermal conductance is smaller than the outer axial aggregate thermal conductance.

10. The brake drum of claim 1, wherein at least one cooling conduit of the set of cooling conduits extends axially over at least 90% of the axial extension of the braking surface.

11. The brake drum of claim 1, wherein a distance in the axial direction between the inner axial cross-section and the outer axial cross-section is at least 10% of the axial extension of the braking surface.

12. The brake drum of claim 1, wherein the larger one of the inner and outer axial aggregate thermal conductances is at least 30% larger than the other one of the inner and outer axial aggregate thermal conductances.

13. A drum brake for a vehicle, the vehicle having a longitudinal center plane extending along a longitudinal direction and a vertical direction and separating the vehicle into a first and a second longitudinal half, the longitudinal direction extending in a direction parallel to the intended direction of travel of the vehicle, the drum brake comprising:
  a brake shoe; and
  a brake drum comprising:
    a braking surface adapted to receive at least one brake shoe of the drum brake, the braking surface having a circumferential extension in a circumferential direction and an axial extension in an axial direction, the brake drum further comprising an outer surface at least partially enclosing the braking surface,
    a cooling arrangement, comprising a set of cooling conduits located between the braking surface and the outer surface and extending at least partially in the axial direction, and
    an inner axial cross-section and an outer axial cross-section which are located within the axial extension of the braking surface,
    wherein the brake drum is configured to be mounted to the vehicle such that the inner axial cross-section is located closer to the center plane than the outer axial cross-section,
    wherein the cooling arrangement extends through each one of the inner axial cross-section and the outer axial cross-section, the material of the brake drum located radially between the set of cooling conduits and the braking surface at the inner axial cross-section having an inner axial aggregate thermal conductance, the material of the brake drum located radially between the set of cooling conduits and the braking surface at the outer axial cross-section having an outer axial aggregate thermal conductance,
    wherein the inner axial aggregate thermal conductance is different from the outer axial aggregate thermal conductance.

14. A vehicle comprising:
a longitudinal center plane extending along a longitudinal direction and a vertical direction and separating the vehicle into a first and a second longitudinal half, the longitudinal direction extending in a direction parallel to the intended direction of travel of the vehicle,
a brake drum, comprising:
  a braking surface adapted to receive at least one brake shoe of the drum brake, the braking surface having a circumferential extension in a circumferential direction and an axial extension in an axial direction, the brake drum further comprising an outer surface at least partially enclosing the braking surface,
  a cooling arrangement, comprising a set of cooling conduits located between the braking surface and the outer surface and extending at least partially in the axial direction, and
  an inner axial cross-section and an outer axial cross-section which are located within the axial extension of the braking surface,
  wherein the brake drum is configured to be mounted to the vehicle such that the inner axial cross-section is located closer to the center plane than the outer axial cross-section,
  wherein the cooling arrangement extends through each one of the inner axial cross-section and the outer axial cross-section, the material of the brake drum located radially between the set of cooling conduits and the braking surface at the inner axial cross-section having an inner axial aggregate thermal conductance, the material of the brake drum located radially between the set of cooling conduits and the braking surface at the outer axial cross-section having an outer axial aggregate thermal conductance,
wherein the inner axial aggregate thermal conductance is different from the outer axial aggregate thermal conductance.

* * * * *